US007997312B2

(12) United States Patent
Van Valkenburg

(10) Patent No.: US 7,997,312 B2
(45) Date of Patent: Aug. 16, 2011

(54) SYSTEM AND DEVICE FOR POSITIONING A WORKPIECE RELATIVE TO A ROUTER AND USE THEREOF

(76) Inventor: Sjoerd Anne Van Valkenburg, The Hague (NL)

( * ) Notice: Subject to any disclaimer, the term of this patent is extended or adjusted under 35 U.S.C. 154(b) by 186 days.

(21) Appl. No.: 12/372,138

(22) Filed: Feb. 17, 2009

(65) Prior Publication Data

US 2009/0223599 A1 Sep. 10, 2009

Related U.S. Application Data

(60) Provisional application No. 61/029,666, filed on Feb. 19, 2008.

(51) Int. Cl.

| | |
|---|---|
| ***B27C 5/00*** | (2006.01) |
| ***B23Q 17/00*** | (2006.01) |
| ***B23Q 17/22*** | (2006.01) |

(52) U.S. Cl. .................. 144/253.1; 144/286.5; 144/137; 33/638

(58) Field of Classification Search .................. 144/137, 144/135.2, 286.1, 286.5, 253.1, 253.2, 253.6; 33/403, 427, 430, 452, 464, 501.05, 501.06, 33/569, 811, 626, 628, 638, 640, 642; 269/303, 269/315; 83/468.1, 468.2, 468.7, 467.1, 409, 435.11

See application file for complete search history.

(56) References Cited

U.S. PATENT DOCUMENTS

| | | | | |
|---|---|---|---|---|
| 4,793,604 | A * | 12/1988 | Taylor | 269/303 |
| 4,930,221 | A * | 6/1990 | Taylor | 33/811 |
| 5,195,730 | A * | 3/1993 | Taylor | 269/303 |
| 5,215,296 | A * | 6/1993 | Adams et al. | 269/60 |
| 5,553,644 | A * | 9/1996 | Adams | 144/253.2 |
| 5,716,045 | A * | 2/1998 | Taylor | 269/303 |
| 5,890,524 | A * | 4/1999 | Tucker et al. | 144/371 |
| 6,499,224 | B1 * | 12/2002 | Asick | 33/628 |

* cited by examiner

*Primary Examiner* — Shelley Self
(74) *Attorney, Agent, or Firm* — Young & Thompson

(57) ABSTRACT

A system positions a workpiece with respect to a router bit. The system may include a router for routing out a part of the workpiece, a router table for supporting the workpiece, a router fence arranged and constructed to position the workpiece relative to the router during machining, and a positioning device arranged and constructed to position the router fence relative to the router before machining the workpiece, wherein the router comprises a router collet positioned beneath the router table, the router collet being constructed and arranged to engage a router bit extending through an opening in the router table for machining the piece.

19 Claims, 4 Drawing Sheets

SYSTEM AND DEVICE FOR POSITIONING A WORKPIECE RELATIVE TO A ROUTER AND USE THEREOF

BACKGROUND OF THE INVENTION

1. Field of the Invention

The present invention relates to a system and device for positioning a piece to be machined by a router. The invention also relates to the use a system and device for positioning the piece to be machined.

2. Description of the Related Art

A router is a tool, especially used in the woodworking industry, used for milling out (hollow out) an area in the face of a piece of material (workpiece). Usually the material is wood or metal, but applying the router to other types of materials is also possible. There are several types of routers. Nowadays, most common types are spindle type routers (spindle routers), where a router bit is mounted onto a rotatable spindle of an electric motor.

A typical router set-up includes a frame for supporting the router table. The piece of material to be machined is supported by the table. The table has an opening through which a bit protrudes for machining the material. Different bit sizes and shapes can be used, and the bit is easily exchangeable. The bit is engaged by a collet provided with a clamping mechanism such as a number of clamps or jaws. The collet is part of a rotatable spindle that is connected to a motor drive for rotation. The router collet (and router bit mounted in the mouth of the collet) can be rotated around an axis perpendicular to the router table. Sometimes the collet may be able to move with respect to the table, for example, along the axis of rotation by a depth adjustment tool. In this case, the shape of the cut that is created is determined by the size and shape of the bit (cutter) held in the collet and the height of the bit relative to the upper surface of the router table.

A typical router system also includes a router fence. The router fence is placed on top of the table and is used as a stop along which the workpiece can be guided during the machining thereof to ensure that the proper part of the workpiece is cut away. The router fence is used as a directional tool during the processing of the workpiece.

Three important variables determining the router's work are: 1) the shape of the router bit (the cutter); 2) the height of the router bit (in most cases the router machine is held in a router lift, that allows easy vertical travel); and 3) the distance between the router bit and the fence. The first and second variables have been discussed earlier and can be successfully dealt with. Regarding the first variable, a large variety of different router bit shapes are on the market nowadays, allowing an almost indefinite shape to be routed to the workpiece. In the second variable, variation of the router bit height, determines how much of the wood is actually shaped. The variation may be accomplished by a depth adjustment tool, for example a router lift. The router lift allows the entire router machine to be cranked up or down with great precision, exposing more or less of the router bit above the router table. However, the handling of the third variable remains burdensome and is currently to a large extent a process of trial and error. In particular, where the workpiece needs to be shaped in the middle, setting the fence at the correct distance from the router bit is a challenging process that requires solving two previous problems: dividing by two the width of the workpiece and adding to the result half of the router bit's diameter.

Whereas dividing by two the router bit's diameter is no problem, calculating half the workpiece width is challenging when the width of the workpiece is not an "easy" number such as about 1 in, ¾ in, ½ in. etc. (which happens when the wood is previously planed or sanded down to a "random" width).

The resulting numbers have to be added, but more challenging is measuring the distance from the outer diameter of a given router bit to the face of the fence. Typically, router bits have an irregular shape, with a core and a number of cutters. As such, router bits do not really have an evident outer diameter, except for the actual cutter extremities. This makes the above-mentioned determination of the distance between the fence and the router bit difficult.

Woodworkers are required to do the above-described math and struggle to measure the distance to the fence with the help of a tape measure, set-up blocks or any other measuring device. In this respect, it is noteworthy that woodworkers mostly ensure centering a groove in the board by a second pass through the router with the other side of the wood against the fence. This will effectively ensure exact centering of the groove, but in the process sacrifices the groove's intended width, which mostly defeats the object of the exercise.

Currently, as stated above, there is no technical solution on offer, whether mechanized or by way of a slide rule, or any other method, to position a router fence successfully for the purpose of routing a groove through the centerline of a board.

It is further noteworthy that the result of the above-mentioned calculations is affected by the diameter of the chosen router bit, and that the calculation will have to be repeated at each change of diameter.

SUMMARY OF THE INVENTION

An object of the present invention is to provide a good device and system for positioning a workpiece relative to a router.

It is another object of the present invention to provide a device and system wherein at least one of the disadvantages of the prior art have been reduced or even removed.

It is another object of the present invention to provide a system and device wherein the positioning of a workpiece with regard to a router bit can be accomplished fast, accurately and/or easily.

It is another object of the present invention to provide a simple process to effectively solve the problem with regard to the third variable. In particular, the invention seeks to offer a device and a system for machining a piece (of wood) in the center of the workpiece or along a middle line of the workpiece.

The present invention, in part, relates in a first aspect to a system for positioning a workpiece with respect to a router bit, and the system may include a router for routing out a part of the workpiece, a router table for supporting the workpiece, a router fence arranged and constructed to position the workpiece relative to the router during machining thereof, and a positioning device arranged and constructed to position the router fence relative to the router before machining the workpiece. The router may be of a type including a router collet positioned beneath the router table, the router collet constructed and arranged to engage a router bit extending through an opening in the router table for machining the piece.

According to another aspect, the present invention relates to the positioning device as such. In an embodiment the positioning device may include:

a housing provided with an engagement element that is constructed and arranged to engage the router collet, thereby positioning the housing relative to the router collet;

a pointer element for indicating the position for the router fence to be placed;

a displacement mechanism for displacing the pointer element relative to the housing. Since the housing is at a fixed, well-defined position relative to a fixed reference point, i.e., the router collet, also the pointer element, that is displaceable with respect to the housing, can be located accurately at a desired position relative to this well-defined reference point. If the groove is to be machined in the center of the workpiece, and if the width of the workpiece is known or measured (by hand or automatically), the pointer element may be moved over a distance equal to half of the width of the workpiece to ensure a proper placement of the router fence.

In a preferred embodiment of the present invention, the positioning device may include a measurement mechanism for measuring a dimension of the workpiece, and the displacement mechanism is configured to displace the pointer element depending on the measured dimension. The movement of the pointer element is in this embodiment based on the measured dimension, for example the width of the workpiece. Both the measurement of the dimension (i.e., the size) of the workpiece and the displacement of the pointer element are relative to the same reference point, which has a positive effect on the accuracy of the placement of the router fence.

In a further embodiment of the present invention, the measurement mechanism may include a fixed element and a moveable element, both elements being arranged to hold the piece in between the faces of the fixed element and the movable element and wherein the dimension to be measured is the distance between the face of the fixed element and the face of the moveable element. The fixed and movable element may form a vise-type slider that may be opened and closed again to keep in between the workpiece. More specifically, the fixed and movable element may determine exactly the dimension (distance between the faces of the elements) of that part of the workpiece that is to be machined by the router.

The size of the workpiece, determined as the distance between the fixed and movable element, is to be converted into the distance the pointer element is to travel relative to the housing to exactly indicate the preferred position of the router fence. One preferred way of achieving this conversion is by making the measurement mechanism a part of the displacement mechanism, providing the movable element with a first sliding element guided in the housing and providing a second sliding element at which the pointer element is formed or mounted.

In an embodiment of the present invention, the positioning device may include a transmission mechanism for transmitting the displacement of the first sliding element to the second sliding element in a predetermined transmission ratio, for example a transmission ratio of about 2:1 in the case that the router bit should make a groove along the center longitudinal axis of the workpiece. In other words, the transmission mechanism may be arranged to control the sliding distance of the pointer element.

The transmission may include a gearbox mechanism, but other arrangements, however, are also conceivable, for example transmissions using sliding wheels, friction wheels, etc.

The present invention is particularly suited for setting up an improved positioning device for machining a center part of the piece, but is not limited thereto. The system and device may be able to position the bit with respect to the piece according to different relations of between the measured size and the intended position of the groove.

According to another embodiment of the present invention, a positioning device may be provided for indicating a position for placement of a router fence arranged and constructed to guide a workpiece relative to a router, the router including a router collet wherein a router bit can be mounted for routing out a part of the workpiece, the positioning device including:

a housing provided with an engagement element that is constructed and arranged to engage the router collet so as to position the housing relative to the router collet;

a pointer element for indicating the position for the router fence to be placed;

a displacement mechanism for displacing the pointer element relative to the housing, the displacement mechanism including a measurement mechanism for measuring the width of the workpiece and a transmission for transmitting the measured width into a displacement of the pointer element.

The system according to the present invention may include a router, a router table, a router fence and the positioning device as described herein. The positioning device may be integrated with the system, but can also be a separate part. This allows the positioning device to be stored easily.

The device may further include a pointer element for indicating a position of the router fence. It indicates in the stage before machining the workpiece and before the router bit has been placed in the collet, the desired position of the fence for a given machining process. The fence should then be fixed at the position indicated. Once the fence has been fixed to the router table, the positioning device may be removed and the router bit may be mounted to the router collet. The pointer element could be a simple measuring tape in an embodiment, but in other embodiments it forms a base against which the router fence can be placed.

Whereas before, it was necessary to perform a number of calculations and rely on a shop rule or other measuring device for the actual placing of the router fence, the present invention allows for a simple operation that automatically indicates the correct positioning of the fence. The process is successful, irrespective of the width of the workpiece, as well as of the diameter of the router bit, and entirely avoids any recourse to mathematics or other separate measuring devices.

According to several embodiments of the present invention the engagement element may be formed by a pin for determining the exact position of the auxiliary device, more precisely, the position of the device with respect to a fixed and well-defined reference point, i.e., the router collet. In virtually all router machines this collet has about a ½ in. diameter, corresponding with the diameter of the router bit shank. The pin therefore may have the same or similar diameter. In an embodiment, the location of the positioning device may be fixed by inserting a fixed pin of about ½ in diameter into the router collet.

According to the present invention the positioning may be executed prior to inserting a router bit in the collet and as such registers from the router itself.

Since the (center of the) collet itself is the reference point, the resulting measurement is essentially unaffected by the bit diameter. The measurement value found is equally unaffected by subsequent use of a collet bushing with router bits with a smaller shank, such as about ¼", or the European standards, about 6, 8 or 12 mm.).

The housing may be preferably provided with a guiding element for guiding the sliding pointer element. The guiding element can be a groove, in particular a groove extending in the longitudinal direction of the housing. The guiding element may extend radially from the pin/collet. The pointer element will move perpendicular to the axis of rotation of the collet.

In an advantageous embodiment of the present invention, the pointer element may be a pusher. This pointer registers the exact location of the fence. Once the fence touches the pointer, it is in the correct position and can be secured. The pointer may be in abutment with the fence. Once the fence has been fixed in its exact location, the positioning device may be removed and the router bit may be inserted. The router set-up is then complete for the routing operation.

Although it will not be required for exact operation, for ease of reference, there may be a width graduation on the top of the housing, marked in (fractions of) inches or marked in metric gradations.

It is preferred to form the housing by extrusion. An aluminum or aluminum alloy extruded housing may be preferred. The positioning device can be a rectangular box, mostly made of extruded aluminium parts.

The router fence according to a further embodiment may include a fixing mechanism for connecting the router fence to the router table at the determined position as indicated by the pointer element.

The positioning device can be mounted on the router table. It can be secured in place using the miter gauge track running across the front of the router table. The positioning device can have connection means for engaging the track. This will allow positioning the device perpendicular to the fence. The track will run parallel to the fence and to the process direction of the bit.

BRIEF DESCRIPTION OF THE DRAWINGS

Embodiments of the invention will now be described by way of example only, with reference to the accompanying drawings, wherein.

DETAILED DESCRIPTION

The following detailed description of embodiments of the present invention will be better understood when read in conjunction with the appended drawings wherein like references indicate similar elements.

Figure 1:
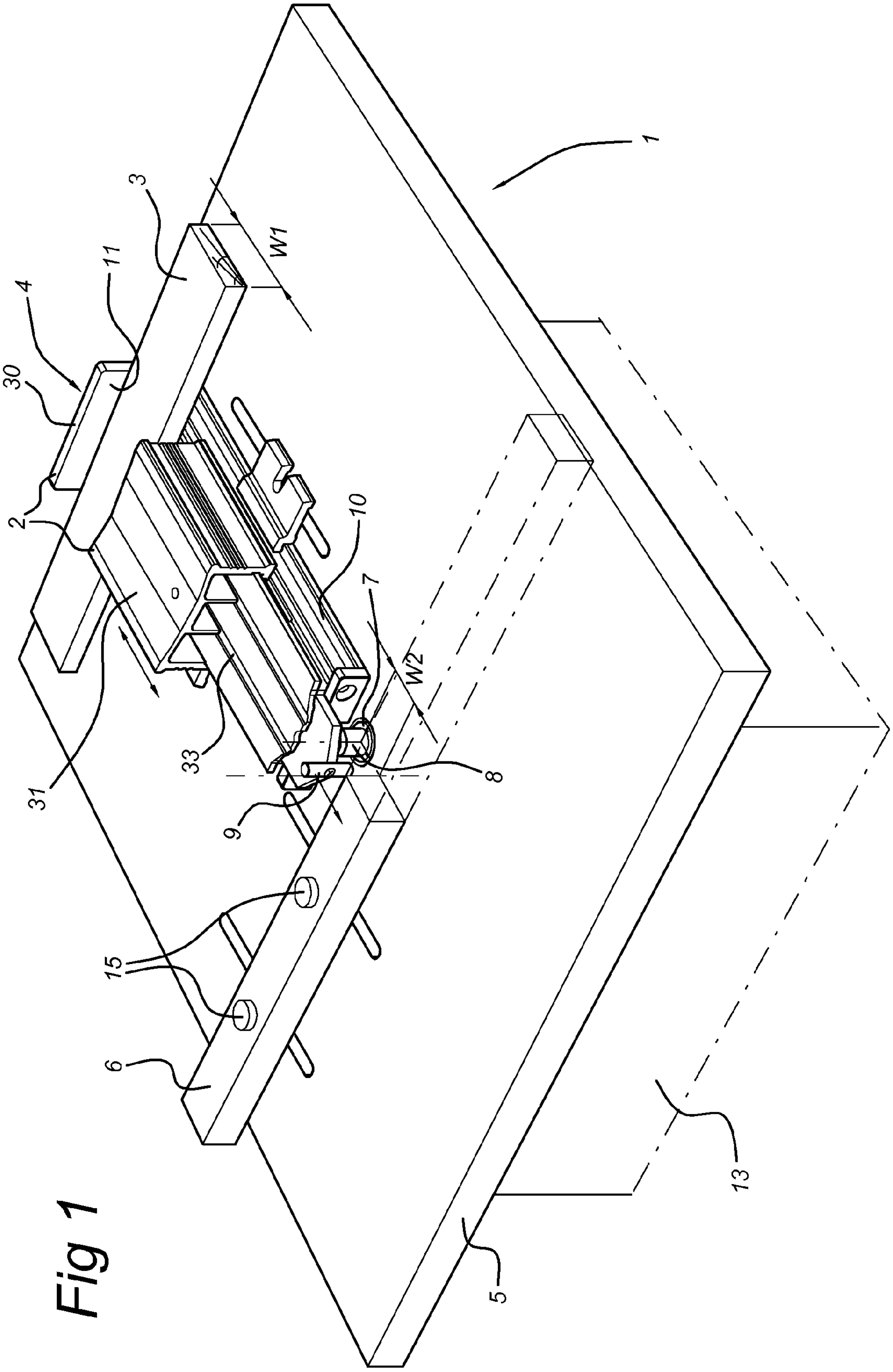
FIG. 1 shows a perspective view of a system for positioning a router bit with respect to a in accordance with an embodiment of the present invention.

FIG. 1 shows a router table 1 including a frame 13 and a tabletop 5. The tabletop 5 is used to support a piece of material 3 (for example a piece of wood) to be machined. A plunge or fixed base router for routing out (hollow out) an area in the face of the piece of material 3 is arranged underneath the router table 1. The router includes a base supported by the router table, the base housing a vertically mounted electric motor with a router collet 7 on the end of its motor shaft. The router collet 7 is supported by a frame that is positioned under the router table and is arranged to take up a router bit, which then extends through an opening in the router tabletop 5. The router table further includes a router fence or guiding fence 6 along which the piece of material 3 is to be guided during the routing out operation. The fence 6 determines a working direction and the position of the groove to be machined in the piece of material. The fence is movable from back to front of the table and may be secured to the tabletop 5 at any desired position. In order to secure the fence to the table top locking means 15 (schematically shown in FIG. 1) are provided. Usually the fence is provided with a gap or opening in the middle (for reasons of clarity not shown in FIG. 1), the gap or opening leaving enough room for the fence to move freely over the router bit.

In order to properly position the fence 6 at a precise distance from the router bit, irrespective of the router bit's diameter, a positioning device 4 is placed on the tabletop, before the actual router bit has been inserted. The positioning device includes a housing 10 having a bottom surface that is in contact with the tabletop 5 of the router table. The housing can be placed freely on the tabletop 5, but may also be secured in place, for example using the miter gauge track (not shown) running across the front of the router table. The positioning device further includes a measuring assembly 2 for measuring a dimension (the size) of the piece, and a movable pointer element 9 for indicating the correct position of the router fence 6, depending on the measured dimension. The housing further includes an engagement pin 8 for engaging with the router collet 7. The engagement pin 8 extends beneath the housing, through the opening in the tabletop into the upper opening of the router collet 7. The engagement pin 8 is used for positioning the positioning device 4 with respect to the router.

The measuring assembly 2 includes a movable piece 31 having a movable face, and a fixed piece 30 with a fixed face 11. In the embodiment shown in the drawing figures, the movable piece and the fixed pace form a vise-type slider that opens up to the exact dimension (width) of the workpiece. More generally, the movable piece 31 is a part of a sliding element, and may be slidably positioned in the housing 10 of the positioning device 4. The pieces 30, 31 are arranged to receive the working piece 3 in between the two respective faces.

The sliding element is engaged by a transmission mechanism 18 for transmitting the measured dimension, which is the mutual distance of the movable and fixed face of the measuring assembly 2 that represents the width w1 of the piece, to a displacement of the pointer element 9. The size measured by the measuring assembly 2 is transferred to the pointer element 9, which is slidably connected to the housing 10. The measured size is then copied to a distance w2, defined as the distance between the center of the router collet 7 and the outermost part of the pointer element 9.

In an embodiment of the invention, the transmission mechanism 18 is arranged to transfer about a 2:1 ratio for the measured parameter onto the pointer element. In other words, the size measured is transferred to a distance between the center of the router collet 7 and the outermost part of the pointer element 9, where the distance is equal to about half of the parameter measured. In this way, a transmission mechanism is provided that provides an easy method for setting the fence at the correct distance from the router bit, in situations where wood needs to be shaped in the middle. It is noteworthy that the result of this calculation is independent of the diameter of the chosen router bit.

Figure 2:
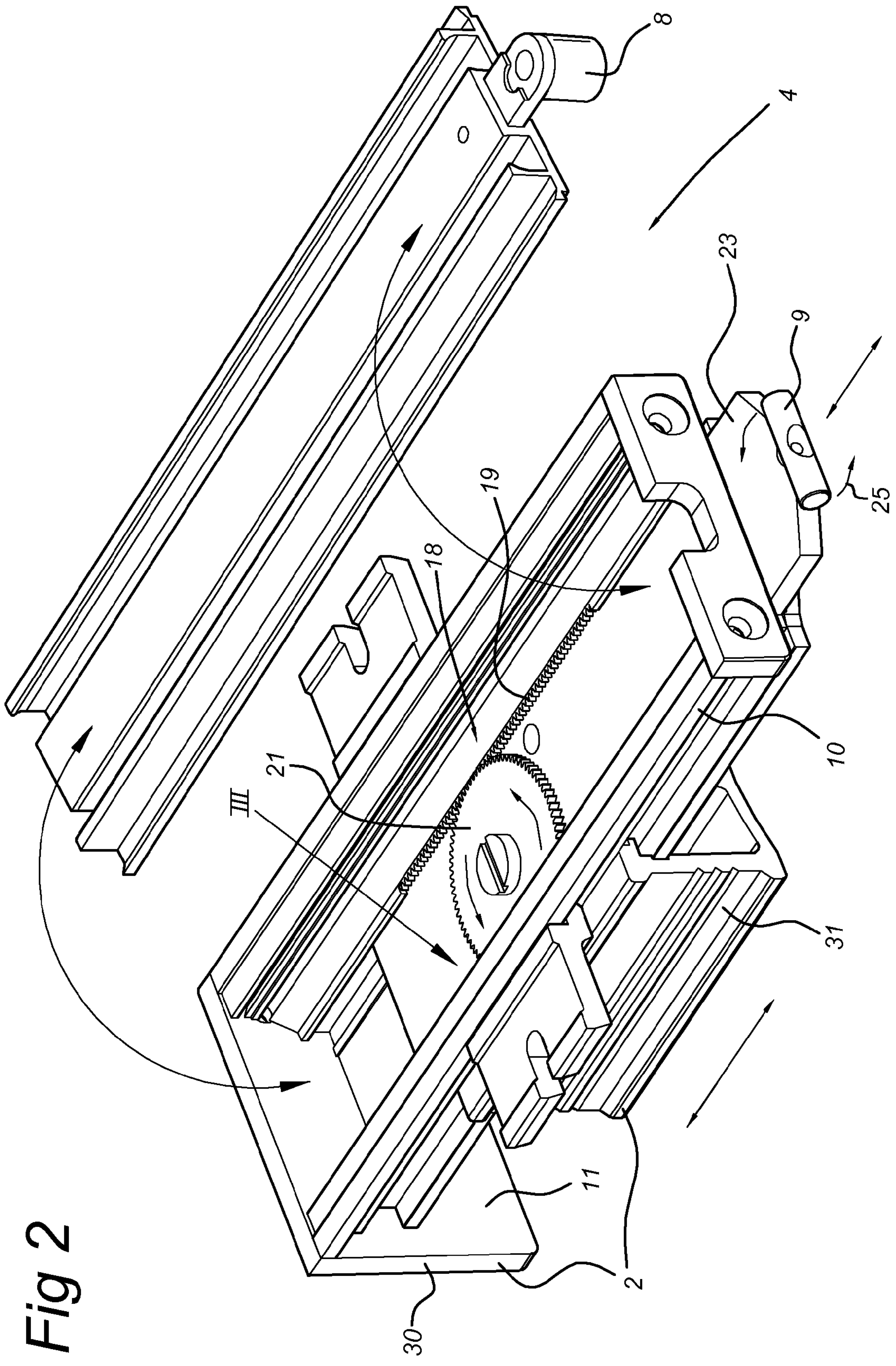
FIG. 2 shows a semi-exploded view in perspective of the back side of a positioning device of the system shown in FIG. 1.
Figure 4:
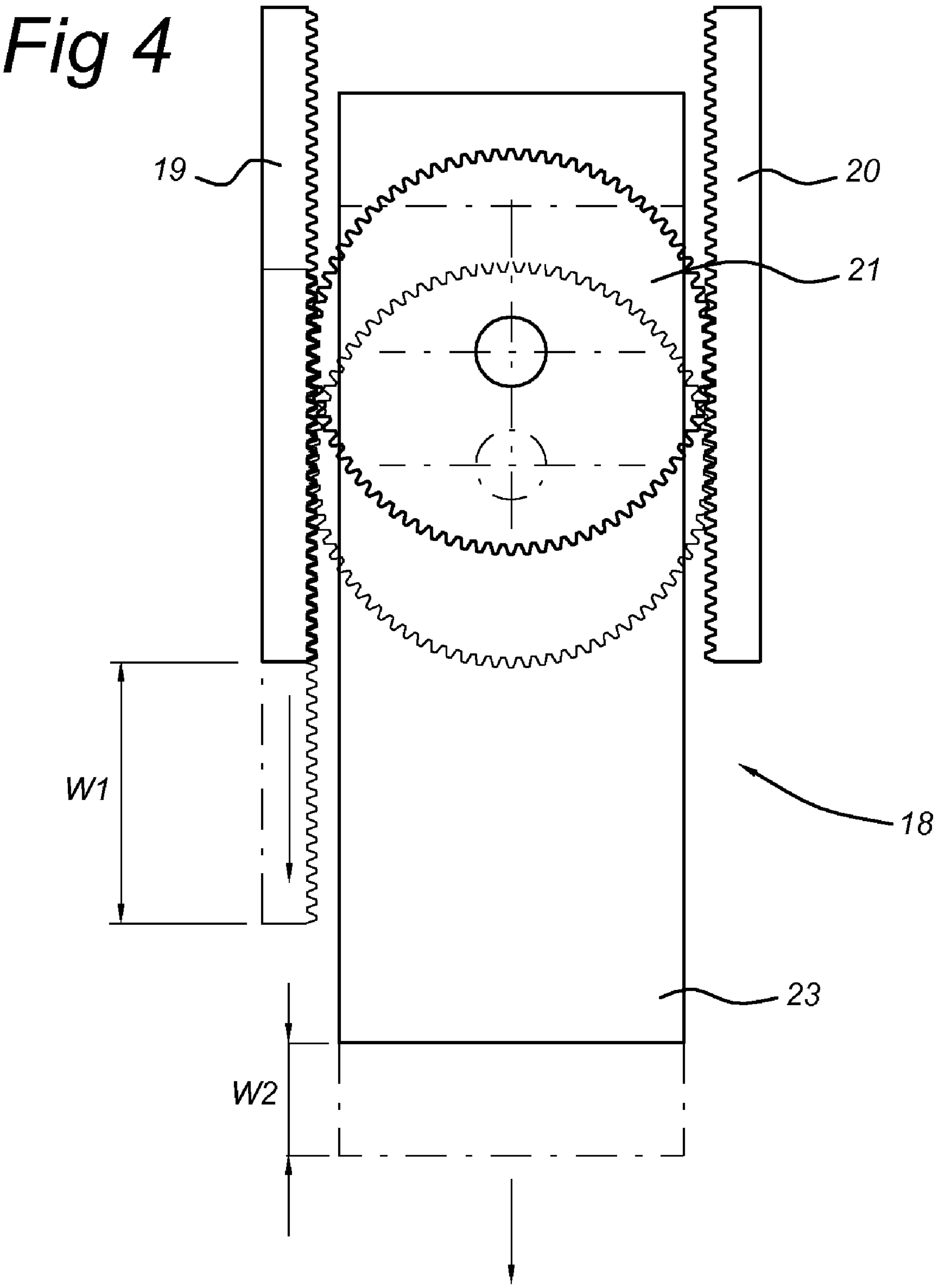
FIG. 4 shows a top-view of a gearbox mechanism according to the current invention.

An embodiment of the transmission mechanism 18 of the positioning device 4 is shown in more detail in FIG. 2. Here, for identifying purposes, the pin 8 for engaging with the router collet 7 in FIG. 1, with its respective housing part, is removed from the positioning device 4, to show the interior of the housing 10 of the positioning device. Inside the housing, the transmission mechanism 18 is visible. In the shown embodiment, the transmission mechanism 18 includes a gearbox mechanism. The transmission mechanism includes a slidable toothed rack 19, which is connected to the sliding part 31 of the measuring element 2. A stationary toothed rack 20, as shown in FIG. 4, is connected to the housing 10. The two toothed racks 19, 20, are interconnected by a gear wheel 21. The gear wheel 21 is connected to a sliding element 23 at one end of which the pointer element 9 is provided. By moving the sliding part 31, the gear wheel 21 is rotated and is moved, together with the sliding element 23, in the longitudinal direction. This causes the pointer element 9 to move in or out (direction 26, cf. FIG. 2) over a distance (w2) depending on the measured size (w1) of the workpiece.

Figure 3:
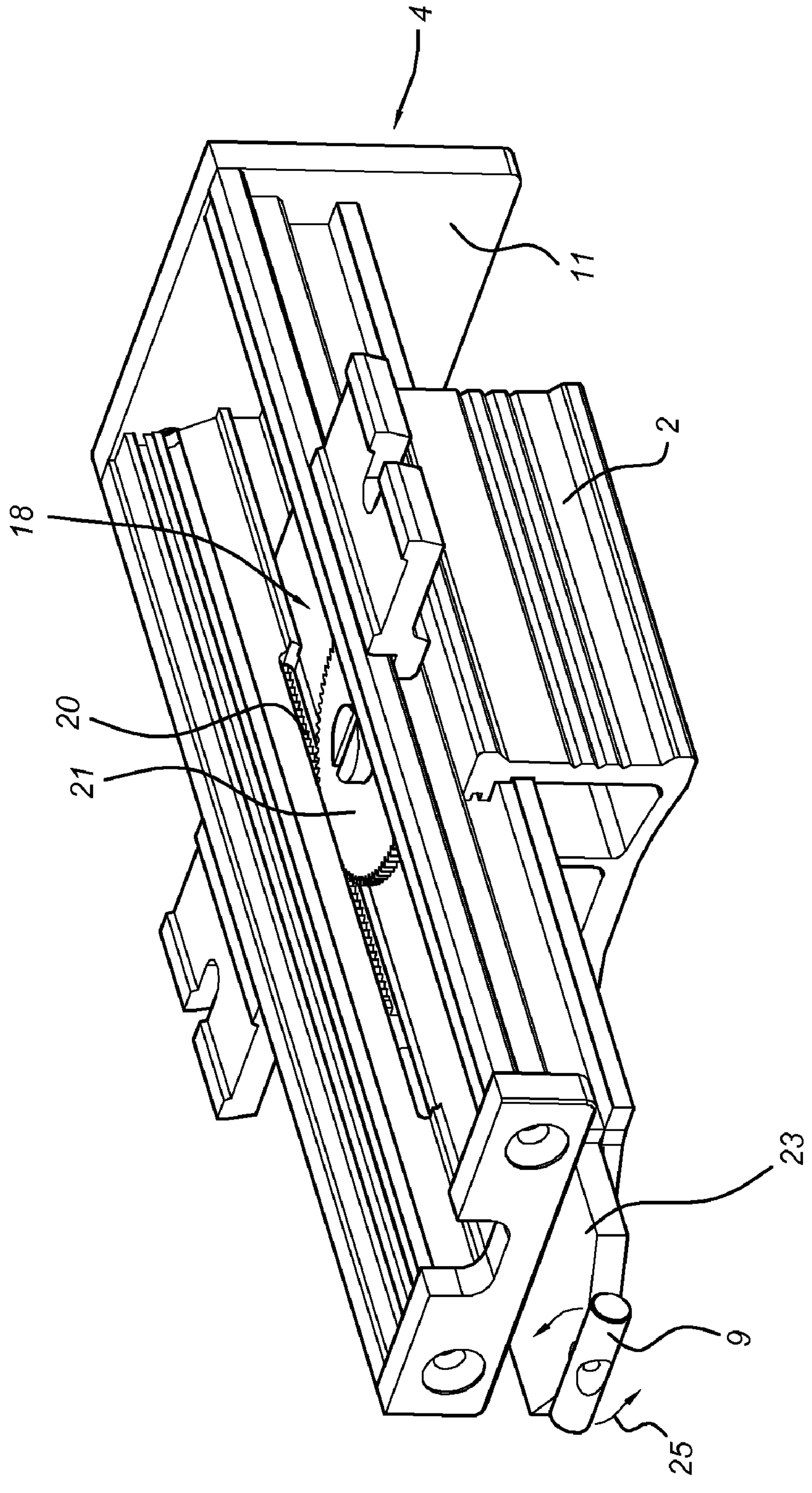
FIG. 3 shows another perspective bottom view of the positioning device.

The pointer element 9 can be pivoted around an essentially horizontal axis (cf. arrows 24 in FIGS. 2 and 3) to be arranged horizontally or vertically, without compromising in either position its exact location in relation to the slider. In its vertical position, the bottom of the pointer acts as set-stop for the zero-setting of the pin. The latter is mounted in a channel on the underside of the device and can removed for storage or transportation, and can be moved in or out with the purpose to position the pin at the "zero point", in relation to the pointer (the front of the pointer is in the same plane as the centerline of the pin). To this end, in the top of the pin holder there is an indent of the size and shape of the pointer for easy setting. Furthermore, in the abovementioned channel, there is a second slider with a set screw allowing the pin to return to the same setting after removal.

Although the invention has been described with reference to specific embodiments thereof, it will be appreciated that invention is not limited to these embodiments and that changes and modifications to the system and method described herein may be made without departing from the invention. The rights applied for are defined by the following claims.

The invention claimed is:

1. A positioning device for positioning a workpiece relative to a router, the router including a router collet to be positioned beneath a router table and a router fence along which the workpiece can be guided during the machining thereof, the router collet constructed and arranged to engage a router bit extending through an opening in the router table for machining the workpiece, the positioning device comprising:

a housing provided with an engagement element that is constructed and arranged to engage the router collet, thereby positioning the housing relative to the router collet;

a pointer element for indicating a position for the router fence to be placed; and a displacement mechanism for displacing the pointer element relative to the housing;

a measurement mechanism for measuring a dimension of the workpiece, wherein the measurement mechanism comprises a fixed element and a moveable element, both elements being arranged to hold the workpiece in between the faces of the fixed element and the movable element and wherein the dimension to be measured is the distance between the face of the fixed element and the face of the moveable element;

wherein the measurement mechanism is part of the displacement mechanism and wherein the movable element is provided with a first sliding element guided in the housing;

wherein the displacement mechanism comprises a second sliding element provided with the pointer element, and the displacement mechanism is configured to displace the pointer element depending on the measured dimension by means of a transmission for transmitting the displacement of the first sliding element to the second sliding element in a predetermined transmission ratio.

2. The device according to claim 1, wherein the transmission ratio is 2:1.

3. The device according to claim 1, wherein the transmission comprises a gearbox mechanism.

4. The device according to claim 1, wherein the transmission comprises a first toothed rack connected to the first sliding element and a second toothed rack connected to the housing, interconnected by a gear wheel connected to the second sliding element.

5. A positioning device for indicating a position for placement of a router fence arranged and constructed to guide a workpiece relative to a router, the router including a router collet wherein a router bit can be mounted for routing out a part of the workpiece, the positioning device comprising:

a housing provided with an engagement element that is constructed and arranged to engage the router collet so as to position the housing relative to the router collet;

a pointer element for indicating a position for the router fence to be placed;

a displacement mechanism for displacing the pointer element relative to the housing, the displacement mechanism comprising a measurement mechanism for measuring a width of the workpiece and a transmission for transmitting the measured width into a displacement of the pointer element.

6. The device according to claim 5, wherein the transmission has a predetermined transmission ratio.

7. The device according to claim 5, wherein the transmission has a transmission ratio of 2:1.

8. The device according to claim 5, wherein the transmission comprises a gearbox mechanism.

9. A system for positioning a workpiece with respect to a router bit, the system comprising:

a router for routing out a part of the workpiece;

a router table for supporting the workpiece;

a router fence arranged and constructed to position the workpiece relative to the router during machining thereof, wherein the router comprises a router collet positioned beneath the router table, the router collet constructed and arranged to engage a router bit extending through an opening in the router table for machining the workpiece; and a positioning device arranged and constructed to position the router fence relative to the router before machining the workpiece, and wherein the positioning device comprises:

a housing having at least a first contact surface for placement of the housing on the router table, the housing being provided with an engagement element that is constructed and arranged to engage the router collet, thereby positioning the housing relative to the router collet;

a pointer element for indicating the position for the router fence to be placed; and a displacement mechanism for displacing the pointer element relative to the housing.

10. The system according to claim 9, wherein the positioning device comprises a measurement mechanism for measuring a dimension of the workpiece and the displacement mechanism is configured to displace the pointer element depending on the measured dimension.

11. The system according to claim 9, further comprising a measurement mechanism formed from a fixed element and a moveable element, both elements being arranged to hold the piece in between the faces of the fixed element and the movable element and wherein the dimension to be measured is the distance between the face of the fixed element and the face of the moveable element.

12. The system according to claim 11, further comprising a measurement mechanism that is part of the displacement mechanism and wherein the movable element is provided with a first sliding element guided in the housing.

13. The system according to claim 12, wherein the displacement mechanism comprises a second sliding element provided with the pointer element.

14. The system according to claim 13, further comprising a transmission configured for transmitting the displacement of the first sliding element to the second sliding element in a predetermined transmission ratio.

15. The system according to claim 14, wherein the transmission ratio is 2:1.

16. The system according to claim 14, wherein the transmission comprises a gearbox mechanism.

17. The system according to claim 16, wherein the transmission comprises a first toothed rack connected to the first sliding element and a second toothed rack connected to the stationary housing, interconnected by a slidable gear wheel to the second sliding element.

18. The system according to claim 9, wherein the router fence comprises fixing means for connecting the router fence to the router table at a determined position as indicated by the pointer element.

19. The system according to claim 9, wherein the router table is provided with a mitre gauge track running parallel to the router fence, and the positioning device has connection means for securing the positioning device to the track.

* * * * *